United States Patent
Fischer et al.

(10) Patent No.: US 11,876,895 B2
(45) Date of Patent: *Jan. 16, 2024

(54) SECURE INSTALLATION OF APPLICATION KEYS

(71) Applicant: NAGRAVISION SARL, Cheseaux-sur-Lausanne (CH)

(72) Inventors: Jean-Bernard Fischer, Cheseaux-sur-Lausanne (CH); Nicolas Fischer, Cheseaux-sur-Lausanne (CH); Fabien Gremaud, Cheseaux-sur-Lausanne (CH); Karine Villegas, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,909

(22) Filed: Sep. 9, 2022

(65) Prior Publication Data

US 2023/0070124 A1 Mar. 9, 2023

Related U.S. Application Data

(63) Continuation of application No. 16/958,104, filed as application No. PCT/EP2018/086576 on Dec. 21, 2018, now Pat. No. 11,496,292.

(30) Foreign Application Priority Data

Dec. 29, 2017 (EP) ..................... 17306983

(51) Int. Cl.
*H04L 9/08* (2006.01)
*H04L 9/14* (2006.01)

(52) U.S. Cl.
CPC ............ *H04L 9/0822* (2013.01); *H04L 9/083* (2013.01); *H04L 9/0825* (2013.01); *H04L 9/14* (2013.01)

(58) Field of Classification Search
CPC ..... H04L 9/0822; H04L 9/0825; H04L 9/083; H04L 9/14; H04L 9/0819
See application file for complete search history.

(56) References Cited

U.S. PATENT DOCUMENTS 7,831,051 B2 * 11/2010 Zunke ................... H04L 9/0838
713/168
8,843,750 B1 * 9/2014 Sokolov ................ H04L 63/061
713/175

(Continued)

FOREIGN PATENT DOCUMENTS

WO 2016/137304 A1 9/2016
WO 2017/108727 A1 6/2017

OTHER PUBLICATIONS

International Search Report dated Jan. 29, 2019 in PCT/EP2018/086576 filed Dec. 21, 2018.

(Continued)

*Primary Examiner* — Abiy Getachew
(74) *Attorney, Agent, or Firm* — Oblon, McClelland, Maier & Neustadt, L.L.P.

(57) ABSTRACT

The present disclosure includes methods, devises and systems for preparing and installing one or more application keys owned by application owners in a remote device. The present disclosure further proposes methods, devices and systems for secure installation of subsequent application keys on a device utilising corresponding key derivation functions to associate an application with a respective policy (Continued)

and identifier using significantly lmv bandwidth for transfer of keys for execution of the respective application on the device.

13 Claims, 3 Drawing Sheets

(56) References Cited

U.S. PATENT DOCUMENTS

| | | | |
|---|---|---|---|
| 9,009,480 B1* | 4/2015 | Wu | H04L 63/045 |
| | | | 713/171 |
| 2012/0159148 A1 | 6/2012 | Behren et al. | |
| 2015/0113281 A1 | 4/2015 | Boivie et al. | |
| 2015/0113285 A1 | 4/2015 | Boivie et al. | |
| 2016/0254918 A1* | 9/2016 | Liu | H04L 63/0823 |
| | | | 713/156 |
| 2018/0254901 A1* | 9/2018 | Egorov | H04L 9/0822 |
| 2019/0020933 A1 | 1/2019 | Bieber et al. | |
| 2020/0236093 A1* | 7/2020 | Bannister | H04L 9/3263 |
| 2020/0344075 A1* | 10/2020 | Gremaud | H04L 9/0894 |

OTHER PUBLICATIONS

European Examination Report dated Dec. 14, 2020 in Application No. 17306983.2.
European Examination Report dated Mar. 31, 2022 in Application No. 18826061.6.

* cited by examiner

SECURE INSTALLATION OF APPLICATION KEYS

CROSS-REFERENCE TO RELATED APPLICATIONS

This application is a continuation of U.S. patent application Ser. No. 16/958,104 filed Jun. 25, 2020 (incorporated herein by reference in its entirety), which is a National Stage of PCT/EP2018/086576 filed Dec. 21, 2018, and claims priority to European Patent Application No. 17306983.2 filed Dec. 29, 2017.

FIELD

The present disclosure relates to the installation of keys associated with an application on a remote device, for managing execution of the application on the remote device.

BACKGROUND

Remote devices capable of executing one or more applications or processes relating to an application, require secure methods of data transfer, updates of application policies and/or associated keys from an application owner in order for the remote device to access the application or execute processes associated with it. The application is usually owned and managed by or from an application owner device. Commonly, installation of application keys and secure data transfer can be achieved by symmetric and asymmetric key encryption methods.

Although secure transfer can be achieved by these techniques, this often leads to large bandwidth use each time the remote device requires or acquires new application keys, policies or other application specific credentials from the application owner device, as this requires both symmetric and asymmetric methods to ensure secure transfer.

There are restrictions from the owner of the remote device, which may be different from those that may be the application owner. The owner of an application embedded in a remote device will want to secure the data generated or received by his application, so that confidentiality and integrity of the data cannot be compromised. There is thus a need for a solution that allows the owner of the remote device, typically a Network Operator, to assert specific policy(ies) to control the data generated or received by an application, with limited communication bandwidth and power constraints. There is thus a need to provide the owner of a remote device, a solution to limit an application to generate or receive data in a specific physical location, for example.

BRIEF DESCRIPTION OF THE DRAWINGS

Various embodiments are now described by way of example for the purpose of explanation and illustration, with reference to the accompanying drawings in which.

DETAILED DESCRIPTION

Figure 1:
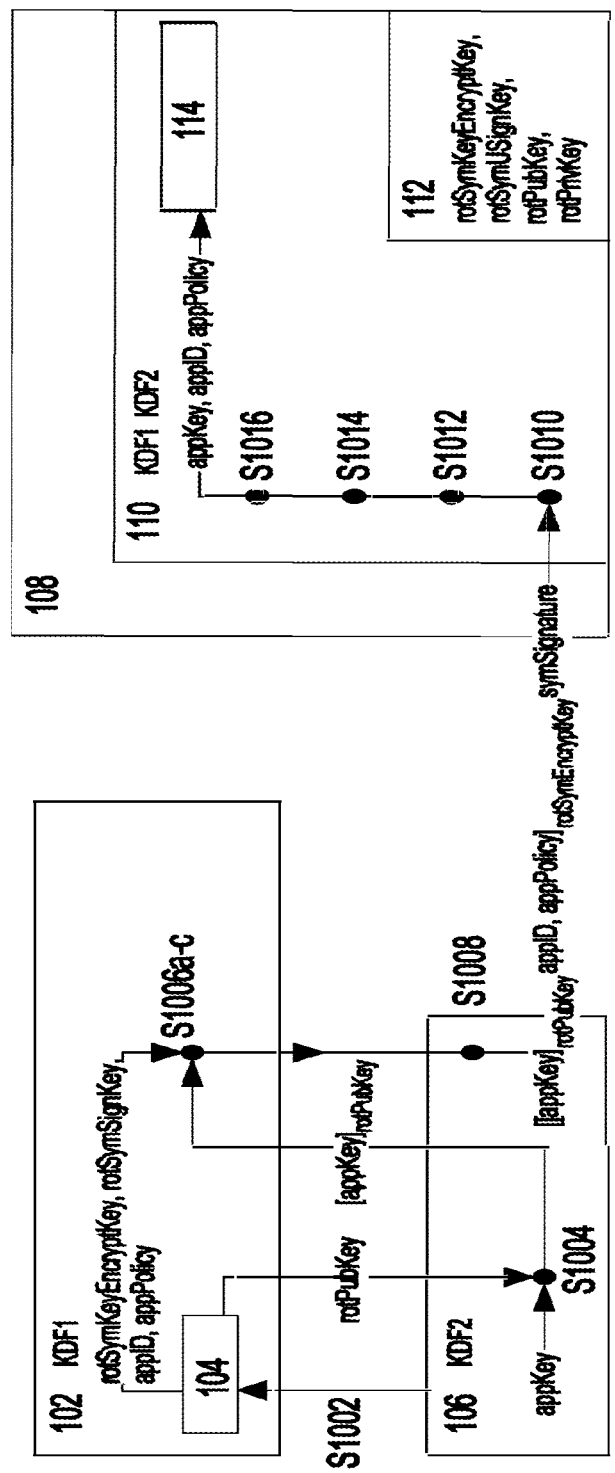
FIG. 1 is a schematic depicting a first embodiment of the disclosure for the installation of an application policy on a remote device for execution of the respective application.

In overview, methods and devices in accordance with the present disclosure provide secure installation of application keys associated with an application from an application owner (also referred to as an application owner device) onto a remote device in a different physical location to the owner device. The methods and devices may improve or optimise bandwidth usage during the installation. Data security is particularly important when a remote devices or network is communicatively coupled with one or more application owners. Hence this requires a secure method by which keys, policies and identifiers, and any other measures of data security cannot be by-passed.

The use of symmetric and asymmetric keys and associated encryption methods although secure, use a lot of network and processing resources, especially network bandwidth of a wireless communication network during installation. For example, considering ECIES encryption using a classical MAC signature, the extra size per message is around 80 bytes. Additionally, since application keys are commonly renewed, sometimes on a regular basis, similar transfer methods are used to ensure secure transfer of new application keys and consequently lead to large bandwidth costs and strains on the network each time new application keys are required to be installed. In addition, an application policy dictated by the device owner, which may be a set of executable code or instructions dictating one or more features of or limitations concerning the application, may also need to be sent each time new keys are sent.

The present disclosure, in a first embodiment, proposes methods, devices and systems for transfer a first application key, also known as an application root key in some cases, to a remote device.

An associated policy for the application, which is preferably defined by the remote device owner for the respective application, rather than the application owner, may also be associated with the root application key transfer. Along with the application root key, an identifier of the respective application may also be also provided or transferred to the remote device, said identifier associated with the respected application to be executed on the remote device, through secure key exchange protocols, preferably with both symmetric and asymmetric encryption methods.

The application policy is defined, and may be stored or processed at a key management system (KMS) in one aspect. The KMS may preferably be controlled by the remote device owner. The remote device is configured to, once the remote device receives the application policy, to decrypt the first application key for the application/application owner, the identifier, and its associated policy and then store the first application key, application policy and application identifier for further application usage.

Typically, application owners obtain, store or generate further application keys for transfer to the remote device for further or subsequent usage of the application at the remote device. In most cases application keys are symmetric keys, and they may also be for an instant use, i.e. a sole use until the end of an application session or to execute a single process associated with the application. In some cases, the key may be valid for a prescribed length of time, or a range of timings depending on the process executed by the remote device.

However, the use of only symmetric keys is not as secure as a combination of symmetric and asymmetric keys for specifying of application policies on a remote device. This may be problematic when the remote device owner wants to control usage of the application to prevent unauthorised access or execution rights for the processes associated with the application on the device. Thus, both types of keys are generally envisaged to be used, for example when sending an application policy for installation. There may be some highly secure applications, i.e. such as a patch of payment software applications or applications using sensitive data, where both symmetric and asymmetric keys are always sent regardless of whether or not the policy is re-installed each time.

The present disclosure further proposes in a second embodiment methods, devices and systems for secure installation of subsequent or further application keys of an application on a device that already has a respective policy associated with the application installed in the device. This is so that for secure subsequent or further use of the application, at the remote device, only the application keys, which are typically symmetric keys, need to be installed.

This technique involves generating a key seed, preferably in the KMS, which may be controlled by the remote device owner, and for example an operator, with an application policy and/or identifier using a predefined first key derivation function. This key seed is sent to the application owner which then generates a transport key at the application owner with the key seed and an application root key or first application key using a further key derivation function. The application root key is available in the remote device, for example installed as described or otherwise.

This transport key is used to encrypt a new or each subsequent application key to be installed at the device. Thus, now it is just this new or subsequent or further application key that needs to be transferred to be installed at the device, which thereby occupies significantly less bandwidth when compared to requiring symmetric, asymmetric keys and a policy in some cases, each time the device runs the application Thus, there is no means for obtaining, decrypting or using the new or further application key from the application owner without first having access to this transport key, which is generated on the basis of the application policy, and preferably an application identifier. Hence, the application owner can securely transfer the new application keys for subsequent application use to the remote device, utilising less bandwidth, as the new or further application key is typically sized at 16 bytes or so.

The remote device is configured to store or access the above mentioned key derivation functions and has the first or root application key, policy and identifier. One or more computing units associated with the device are configured to regenerate the key seed and therefore can obtain the transport key required to decrypt the received new application key. The new application key may then replace the previous application key and inherit the application policy and identifier, hence further transfer of policies and identifiers are not required. The remote device may store the new application key for further application usage, in one aspect. Otherwise, the process briefly set out about in respect of the second embodiment may be repeated with another new key replacing the present new key.

Although, the initial transfer of the root or first application key, the respective application identifier and preferably its associated policy may potentially take place at a high bandwidth and associated cost; once they have been securely installed at the remote device, further or new application keys can be installed using significantly low bandwidth and/or associated resources. The new application keys are encrypted with a transport key which is generated from a key derivation function, which may be at a lower processing and network resource cost, as symmetric key encryption methods can be employed for this, which are less data intensive than asymmetric key encryption methods. Hence all further, new or subsequent application keys can be securely transferred using on symmetric keys.

Some specific embodiments and components associated with each embodiment are now described by way of illustration with reference to the accompanying drawings, in which like reference numerals refer to like features.

Embodiments of the present disclosure includes a method of preparing one or more application keys owned by application owners for installing in a remote device, each application preferably having a specific application policy managed by the device owner which never knows the application keys. This can be implemented by using a KMS communicatively coupled to the application owner, whereby communication is established via a wired or wireless communication network, and data may be transferred by well-known data transfer protocols.

The KMS is in one aspect responsible for processing application keys and/or generating key seeds for secure transfer of further application keys. The KMS is also configured to include a memory or storage area for obtaining and storing one or more application identifiers and respective policies which relate to the application owner. The application identifiers allow the remote device to associate the application keys to its application owners and the application policies that regulate the data transfer between remote device and application owners. One or more keys may also be stored to process the application keys from the application owner for secure transfer to the remote device. The KMS further may be configured to have at least one processing module for holding a key generation function for generating a key seed for secure transfer of further application keys from application owners to a remote device.

A first aspect by which a KMS can be implemented for secure transfer of an application key from an application owner to a remote device is shown in FIG. 1, which relates to a first embodiment of the present disclosure for installing the root or first application key with the associated policy. The KMS 102 is communicatively coupled to an application owner 106, and the application owner is communicatively coupled to a remote device 108.

The KMS 102 is configured to include a database 104 which stores respective application policies appPolicy and identifiers appID that can be associated to each application at the application owner 106. The KMS 102 is also configured to obtain and store an asymmetric key pair associated with the device 108, which includes device public key corresponding to a device private key stored on and specific to the remote device 108, indicated herein as rotPubKey, and device symmetric keys for signature processing and use in a key exchange process, indicated herein as rotSymSign Key and rotSymKeyEncryptKey, respectively. The KMS 102 also holds a predefined key derivation function KDF1 for key seed generation, which is required for secure transfer of one or more further application keys. This may be within at least one processing module in the KMS 102.

Step S1002 involves a request for the device public key rotPubKey from the application owner 106 sent to the KMS 102 The KMS 102 then sends the rotPubKey to the application owner 106. This is facilitated using one or more transceiver modules in the KMS 102.

In step S1006a, the KMS 102 receives from the application owner 106 the application key, referred to herein as appKey, which is encrypted by the rotPubKey, indicated by [appKey]rotPubKey.

In step S1006b, the KMS 102 further processes the received encrypted application key. [appKey]rotPubKey, by adding an appID and appPolicy from the database 104, or associating the appID and appPolicy with the received encrypted key.

Step S1006c further involves encrypting said processed key with the device symmetric encryption key, indicated as rotSymmKeyEncryptKey from the database 104. Processing the received encrypted application key may further involve being signed with a symmetric device signature key.

In step S1008, once the appID and appPolicy have been associated or added, and encryption and signature generation is complete, the fully processed application key, indicated by [[appKey]rotPubKey, appID, appPolicy]rotSymEncryptKey symSignature, is sent to the application owner 106 for further transfer to the remote device 108. Alternatively, the fully processed application key may be sent directly to the remote device 108 by the KMS 102.

Figure 2:
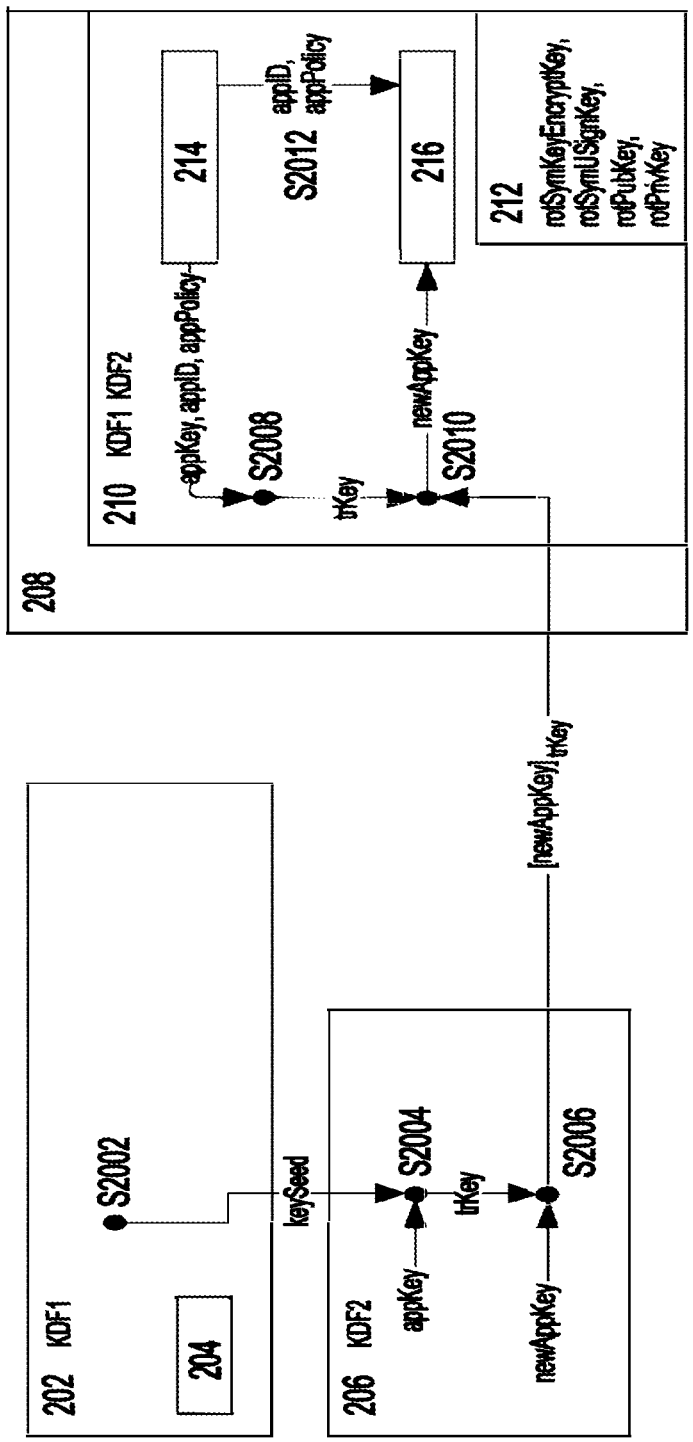
FIG. 2 is a schematic depicting a second embodiment of the disclosure for the installation of further application keys for further operation of respective application on the device.

A second aspect by which the KMS can be implemented for secure transfer of an application key from an application owner to a remote device is shown in FIG. 2, which relates to a second embodiment of the present disclosure for installing subsequent application keys.

FIG. 2. shows a method for which a KMS 202, can process further application keys, indicated as newAppKey from an application owner 206 to a remote device 208. For the purposes of the suggested implementation of the present disclosure, the KMS 202 contains the same configurations and components as described above in the first aspect, including transceiver ports and one or more processing modules.

In step S2002, the KMS 202 generates a key seed, indicated as keySeed from a predefined key derivation function, indicated as KDF1 in a processing module, with the appID and preferably the appPolicy. This is then sent to the application owner 206 for further processing.

A third aspect of the disclosure involves a method of installing a first or root application key and its associated policy from an application owner onto a remote device. This can be implemented by communicatively coupling the application owner to a KMS and remote device, whereby the KMS is configured to act as an application key processor, which ensures secure transfer of the application keys, before the application can send the application keys to the remote device.

One example for which a first or root application key can be installed securely from an application owner onto a remote device is shown in FIG. 1, which relates to a first embodiment of the present disclosure for installing the root or first key with the associated policy.

For purposes of the suggested implementation of the present disclosure, KMS 102 in FIG. 1 includes the same components and configurations as described above in the first aspect. The application owner 106 is configured to store an appKey, which is also referred as a first or root application key, as well as further application keys, such as newAppkey, for installing on the remote device 108, and holds a further key derivation function KDF2, which is configured to generate transport keys for secure transfer of further application keys when implemented.

In step S1002, the application owner 106 requests the rotPubKey from the KMS 102.

In step S1004, the application owner 106 receives the rotPubKey from the KMS 102 and uses it to encrypt the application key appKey, which can only be decrypted with a device private key, indicated herein as rotPrivKey and therefore ensures secure transfer of the appKey to the KMS 102.

In step S1008, the application owner 106 receives the appKey which has been processed by the KMS 102 as described above, given by [[appKey]rotPubKey,appID,appPolicy]rotSymEncryptKey symSignature, and this is further sent from the application owner 106 to the remote device 108 for secure installation.

A fourth aspect of the disclosure is seen in FIG. 2, which relates to a second embodiment of the present disclosure for installing subsequent application keys, involves a method of installing subsequent or further application keys from an application owner 206 onto a remote device 208. The subsequent keys may be stored in the application owner 206 in a storage module in the form of a key list or key ladder for each subsequent use, as necessary.

For the purposes of the suggested implementation of this present disclosure, the KMS 202 and application owner 206 contain the same components and configurations as described above for the second and third aspects.

In step S2002, the application owner 206 receives the keySeed generated in the KMS 202. A transport key, indicated herein as trKey is generated by the application owner 206 using the keySeed and the appKey that was previously transferred to the remote device 208 with a further key derivation function KDF2.

In step S2006, the application owner 206 uses this trKey to encrypt the newAppKey, and the encrypted key, indicated by [newAppKey]trKey, is then sent to the remote device 208 for installation.

A fifth aspect of the present disclosure relates to a remote device which can execute an application using one or more application keys. The remote device is communicatively coupled to the application owner, whereby the application keys, policies and identifiers can be securely transferred from the application owner. The remote device is further configured to store its public key from its public and private key pair, symmetric keys and predefined key derivation functions in the device's memory.

One example by which the remote device can be implemented for processing and storage of application keys is shown in FIG. 1, which relates to a first embodiment of the present disclosure for installing the root or first key with the associated policy.

For the purposes of the suggested implementation of the present disclosure, the KMS 102 and application owner 106 in FIG. 1. contain the same components and configurations as described above in relation to the first and third aspect. The remote device 108 includes a trusted processing module, which may be an embedded Root of Trust 110, indicated as RoT 110 for the device 108. This is shown as RoT 110, which may also include a one-time programmable (OTP) storage 112 and a memory storage 114.

The OTP storage 112 stores rotSymUSignKey, eotSymEncryptKey, rotPubKey and rotPrivKey for decryption of incoming application keys. The RoT 110 is also configured to implement one or more key derivation functions KDF1, KDF2 required to generate the keySeed and trKey described above for further application key decryption.

In step S1010, the remote device 108 receives the encrypted application key, indicated by [[appKey]rotPubKeyappID,appPolicy]rotSymEncryptKey symSignature, from the application owner 106 (or the KMS 102) and checks the signature with rotSymUSignKey.

In step S1012, the remote device 108 decrypts this key with rotSymEncryptKey.

In step S1014, the remote device 108 verifies the appPolicy and associated appID.

In step S1016, the remote device 108 further decrypts this key with the rotPrivKey and stores the decrypted application key, policy and identifier in its memory 114, for further use, such as executing the application based on the associated policy.

In a sixth aspect of the disclosure; having gained access to the application key, policy and identifier obtain as obtained in the fifth aspect above, the remote device 108 can now receive further application keys making efficient use of available bandwidth.

This is illustrated in FIG. 2. associated with the second embodiment of the present disclosure for installing subsequent application keys. For the purpose of the suggested implementation of the disclosure, the KMS 202, application owner 206 and remote device 208 include the same components as set out in relation to the first to fifth aspects. The remote device 208 may include a further memory 216 in the RoT 210.

In step S2008, the RoT 210 receives the appKey, appID and appPolicy from its memory 214 and generates the keySeed and the trKey through key derivation functions KDF1, KDF2 as described in the second and the fourth aspect.

In step S2010, the RoT 210 receives a newAppKey that has been encrypted with the trKey from the application owner 206, given by [newAppKey]trKey. The generated trKey is used to decrypt this new application key, and later stores it in the further memory 216.

In step S2012, the newAppKey in the further memory 216 inherits appPolicy and appID of the previous application key from the first memory 214.

Therefore, the device 208 can thus be configured to execute the application with the new application key, where such key is securely installed in the device 208 utilising a significantly lower amount of bandwidth, when compared to securely sending asymmetric keys associated with an application policy each time a device need to execute an application managed by the application owner.

A preferred aspect of the present disclosure involves the combination of all embodiments described above. Therefore, this includes an example where the application policy, first or root key, and application ID is installed in the device as described in the first, third and fifths aspects, in association with the first embodiment of FIG. 1; followed by installation of the further application key or new application key on the device based on the second, fourth and sixth aspects associated with the second embodiment of FIG. 2.

As a result, less or reduced or lower bandwidth intensive means of secure application key transfer to a remote device is possible, by making through key derivation functions that generate key seeds and transport keys from application credentials that can be regenerated at the remote device for future use. New application keys may then be transferred to the device for installation without application policies and/or identifiers as these can be inherited from the root application key, which therefore reduces the overall bandwidth usage while providing for a robust, scalable, seamless and highly secure key installation technique.

Figure 3:
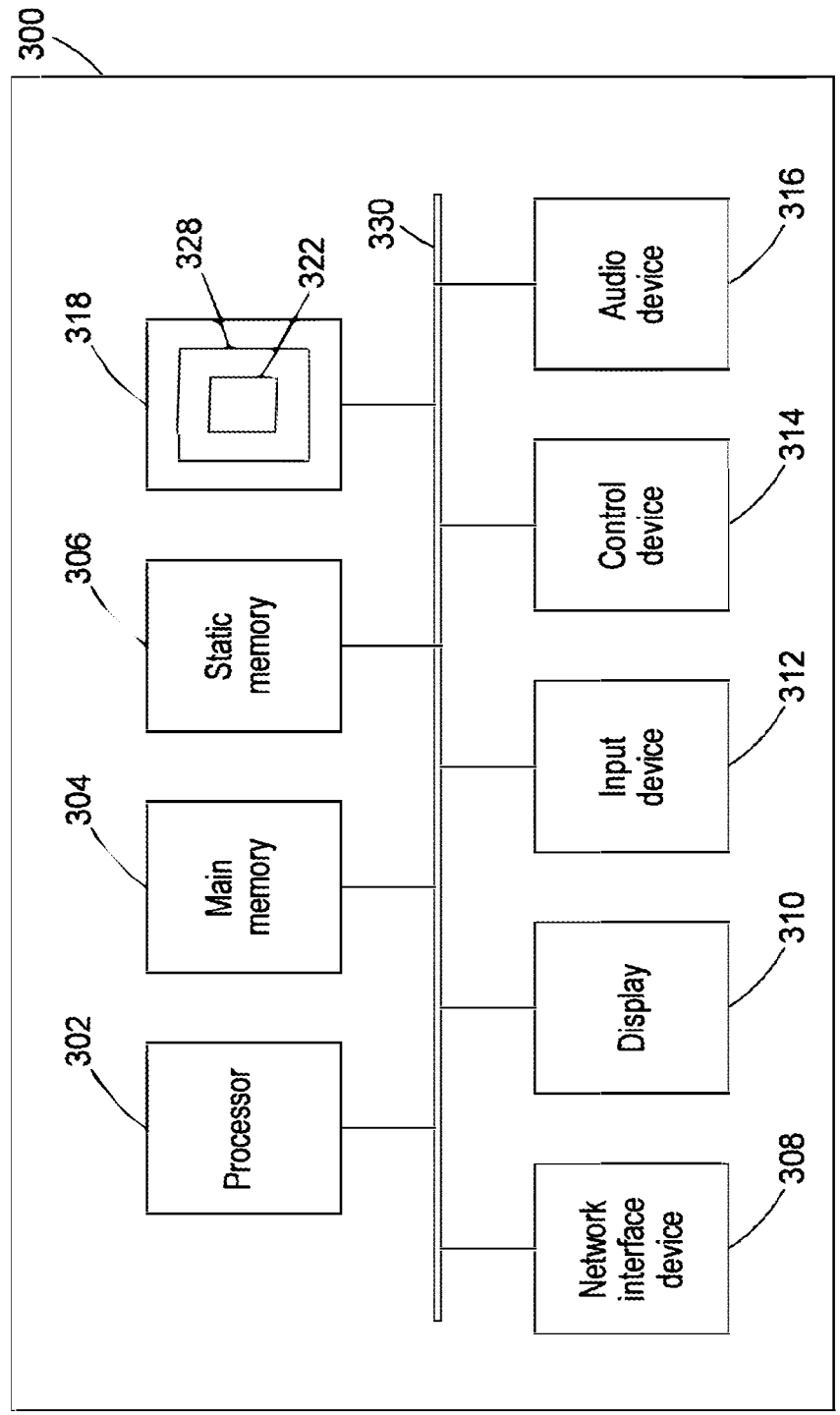
FIG. 3 is an example implementation of a device according to the described embodiments.

FIG. 3. illustrates a block diagram of one implementation of a computing device 300 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory (e.g., a data storage device 318), which communicate with each other via a bus 330.

Processing device 302 represents one or more general-purpose processors such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the processing logic (instructions 322) for performing the operations and steps discussed herein.

The computing device 300 may further include a network interface device 308. The computing device 300 also may include a video display unit 310 (e.g., a liquid crystal display (LCD) or a cathode ray tube (CRT)), an alphanumeric input device 312 (e.g., a keyboard or touchscreen), a cursor control device 314 (e.g., a mouse or touchscreen), and an audio device 316 (e.g., a speaker).

The data storage device 318 may include one or more machine-readable storage media (or more specifically one or more non-transitory computer-readable storage media) 328 on which is stored one or more sets of instructions 322 embodying any one or more of the methodologies or functions described herein. The instructions 322 may also reside, completely or at least partially, within the main memory 304 and/or within the processing device 302 during execution thereof by the computer system 300, the main memory 304 and the processing device 302 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "obtaining", "sending," "implementing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of creating an application key for use in a remote device, the method comprising:
   transmitting a device public key to an application owner, wherein the device public key corresponds to a device private key stored on and specific to the remote device;
   receiving an encrypted application key for an application associated with the application owner, the encrypted application key encrypted with the device public key; and
   processing the received encrypted application key with a symmetric device key, wherein the symmetric device key is specific to and stored on the remote device,
   wherein the app key is created at a key management system.

2. The method according to claim 1, wherein processing the received encrypted application key further comprises encrypting the encrypted application key with a symmetric device encryption key.

3. The method according to claim 1, wherein the received encrypted application key further comprises adding or associating an application policy or identifier for the respective application to the encrypted application key.

4. The method according to claim 1, wherein processing the received encrypted application key further comprises signing the encrypted application key with a symmetric device signature key.

5. The method according to claim 3, further comprising sending a key seed for generating a transport key for installing a second application key on the remote device wherein the key seed is generated using an application policy or an application identifier for the second application.

6. The method according to claim 1, further comprising:
   sending a key seed for generating a transport key for installation of a further application key on the remote device from the application owner, wherein the key seed is generated using an application policy or application identifier for a second application with a key derivation function stored at the key management system and remote device, wherein
   processing the received encrypted application key further comprises
      encrypting the encrypted application key with a symmetric device encryption key,
      adding or associating the application policy or identifier for the second application to the encrypted application key, and
      signing the encrypted application key with a symmetric device signature key, the symmetric device encryption key being different from the symmetric device signature key.

7. A method of installing an application key in a remote device, the method comprising:
   receiving a device public key from a key management system, the device public key corresponding to a device private key stored on and specific to the device;
   transmitting an encrypted application key associated with an application, the encrypted application key being encrypted with the device public key, to the key management system;
   receiving the encrypted application key from the key management system, wherein the encrypted application key has been processed by the key management system with a symmetric device key and includes an application policy and identifier of the application by the key management system, wherein the symmetric device key is specific to and stored on the remote device; and transmitting the encrypted application key to the remote device.

8. The method according to claim 7, further comprising receiving from the key management system a key seed, wherein the key seed is generated based on an application policy associated with the application key and application identifier using a key derivation function;

generating a transport key using a second key derivation function using the key seed and the application key, wherein the second key derivation function is also available at the remote device;

encrypting a second application key with the transport key; and sending the encrypted application key to the remote device for installation.

9. A device for executing an application using one or more application keys, the device comprising:

a memory storing a private device key of a device public, private key pair, and a symmetric device key; and a processor configured to:

receive an encrypted application key of an application, process the received encrypted application key using the symmetric device key, and decrypt the processed encrypted application key using the private device key.

10. The device according to claim 9, wherein the processor is further configured to decrypt the encrypted application key with a symmetric device encryption key.

11. The device according to claim 9, wherein the processor is further configured to decrypt an encrypted application policy and identifier with a symmetric device encryption key for enabling execution of the application on the device based on the decrypted application policy.

12. The device according to claim 9, wherein the processor is further configured to verify a signature of the encrypted application key with a symmetric device signature key.

13. The device according to claim 9, wherein the processor is configured to receive a second application key encrypted with a transport key, compute the transport key using a key derivation function applied to the application key and the output of a second key derivation function, wherein the output of the second key derivation function is computed by applying the second key derivation function to an application policy and identifier associated with the application key, and decrypt the second application key with the transport key.

* * * * *